R. C. MEADOWS.
CORN MILL.
APPLICATION FILED JULY 2, 1912.

1,133,993.

Patented Mar. 30, 1915.
2 SHEETS—SHEET 1.

Inventor
R. C. Meadows.

Witnesses
Wm. H. Mulligan

By Victor J. Evans
Attorney

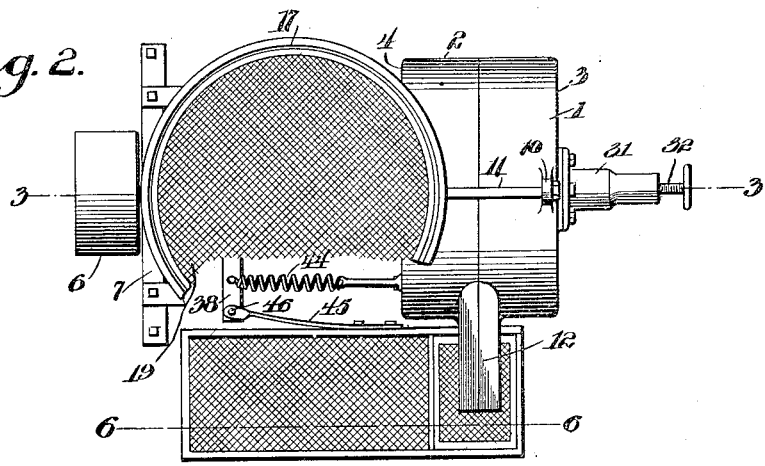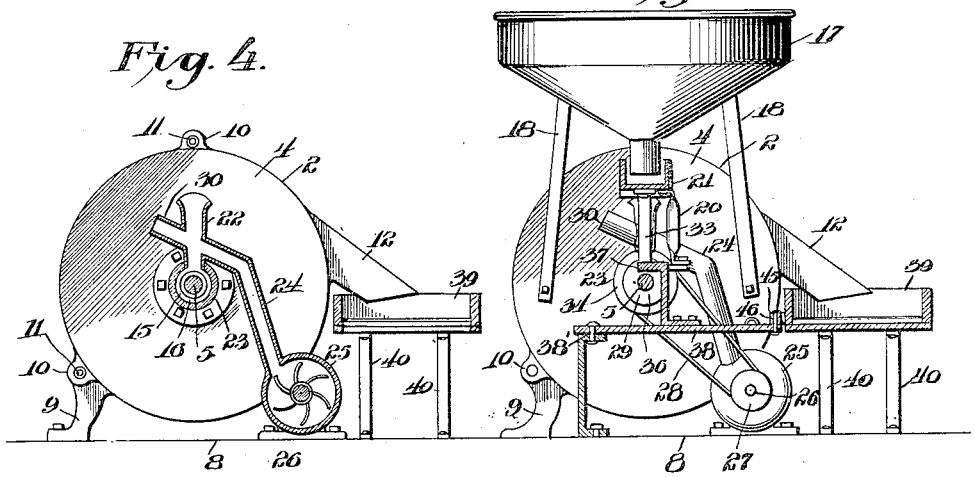

UNITED STATES PATENT OFFICE.

ROBERT C. MEADOWS, OF POORS KNOB, NORTH CAROLINA.

CORN-MILL.

1,133,993.  Specification of Letters Patent.  Patented Mar. 30, 1915.

Application filed July 2, 1912. Serial No. 707,268.

*To all whom it may concern:*

Be it known that I, ROBERT C. MEADOWS, a citizen of the United States, residing at Poors Knob, in the county of Wilkes and State of North Carolina, have invented new and useful Improvements in Corn-Mills, of which the following is a specification.

This invention relates to mills for grinding corn, and one object of the invention is to provide a simple and improved casing for containing the bed stone and the runner stone, and means for conveniently adjusting the runner stone to gage the fineness of the product.

A further object of the invention is to provide a simple and efficient winnowing device in connection with the mill for the purpose of removing dust and foreign matter from the corn previous to grinding.

A further object of the invention is to improve the construction and manner of operation of the sieve for sifting the product.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
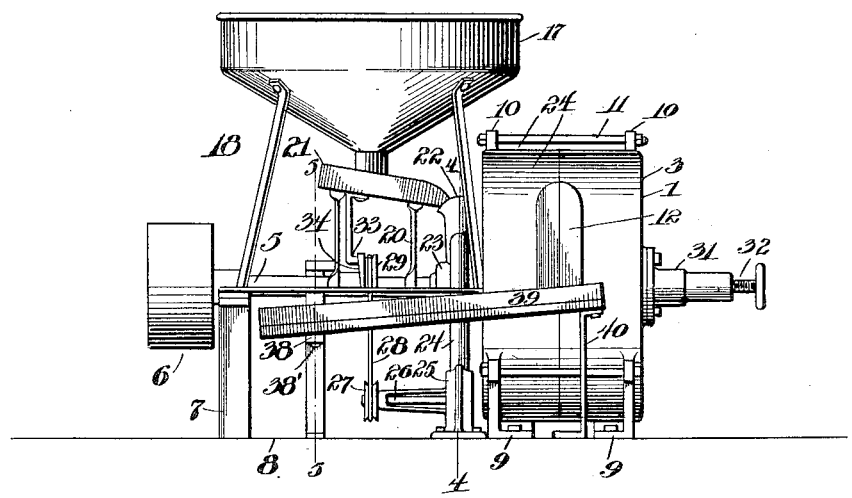
Figure 3:
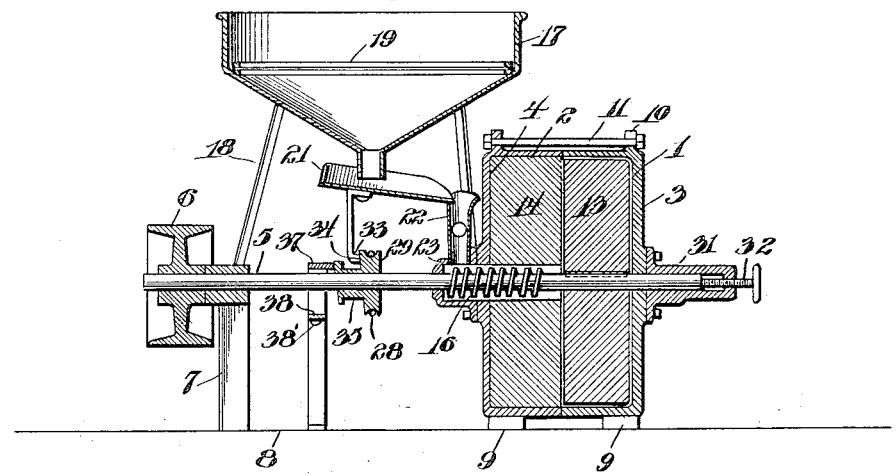

In the drawings,—Figure 1 is a front elevation of a mill constructed in accordance with the invention. Fig. 2 is a top plan view of the same. Fig. 3 is a vertical sectional view taken on the line 3—3 in Fig. 2. Fig. 4 is a transverse sectional view taken on the line 4—4 in Fig. 1. Fig. 5 is a sectional detail view taken on the line 5—5 in Fig. 1. Fig. 6 is a longitudinal sectional view through the sieve taken on the line 6—6 in Fig. 2.

Corresponding parts in the several figures are denoted by like characters of reference.

The casing of the improved mill is composed of two cylindrical members 1 and 2, open at their abutting ends and provided with heads 3, 4, said heads being provided with bearings wherein the shaft 5 is supported for rotation, said shaft being provided at one end with a driving pulley or band wheel 6 adapted to receive motion from any suitable source of power by means of an ordinary belt or band which, owing to the location of the band wheel at one end of the shaft, and outside the bearings of the latter, may be conveniently applied and detached without unlacing. The shaft 5 has an additional bearing upon a bracket 7 which, as well as the casing members 1, 2, is mounted upon a base 8. The casing members 1, 2 are provided with feet 9 adapted to be bolted upon the base, and said casing members are also provided with lugs or ears 10 for the passage of connecting bolts 11, whereby the said casing members may be tightly connected together. The casing members are constructed of integral portions combining to form a discharge spout 12.

The runner stone 13 and the bed stone 14 are arranged within the casing members 1 and 2, respectively, the runner stone being mounted on the shaft 5 for rotation therewith, and the bed stone being provided with an eye 15. That portion of the shaft 5 which extends through the eye 15 of the bed stone is provided with a screw 16.

The hopper 17, which is suitably supported by means of braces 18, contains a sieve or screen 19, whereby the material that is to be ground is subjected to a preliminary screening for the purpose of excluding coarse impurities.

Suitably supported for vibration beneath the hopper 17 by means of springs 20, or in any convenient manner, is a feed chute 21 which discharges into a spout 22 communicating with a casing 23 which surrounds a portion of the shaft 5 and communicates with the eye of the bed stone through the head 4 of the casing member 2. The feed screw 16 may extend within the casing 23 beneath the spout 22 of the latter.

The casing 23 is connected by a duct 24 with the casing 25 of a fan or blower, the shaft of which, 26, carries a pulley 27 connected by a band 28 with a pulley 29 on the shaft 5 from which the fan or blower is driven. The casing 23 is provided with an upwardly ranging discharge spout 30 disposed opposite to the duct 24, said discharge spout being placed at such an angle that dust and impurities will be carried off therethrough by the air current induced by the blower, while the grain will settle by gravity in the casing 23 from which it is carried by the feed screw to the eye of the bed stone.

The box or bearing member 31 which is associated with the head 3 of the casing member 1 and which supports one end of the shaft 5 is provided with a set screw 32 to take up end thrust of the shaft and to force the runner stone carried by the shaft in the direction of the bed stone for the purpose of gaging the fineness of the product.

The spring supported chute 21 is equipped with an arm 33 which is engaged by the inclined or cam-shaped face 34 of the band wheel or pulley 29 on the shaft 5 which serves to transmit motion to the blower. Said pulley has a hub extension 35 provided with an inclined or cam-shaped face 36 engaging the shoe or wear plate 37 on a cross bar 38 which extends across the shaft 5, substantially at right angles thereto, one end of said cross bar being supported pivotally at 38'.

39 designates the sieve which is supported on upright springs 40 in such a position as to receive the meal discharged through the spout 12. Suitably connected with the rear side of the sieve 39 is one end of a flat spring 45, the other end of which is hingedly connected at 46 with the free end of the cross bar 38. A suitably arranged spring 44 serves to force the cross bar 38 in the direction of the cam face 36 with which it is held in contact and by the rotation of which it will receive the vibratory motion which is imparted to the sieve 39. The spring 44 will also through the medium of the cross bar 38 exert a longitudinal stress upon the shaft 5, whereby said shaft is moved in the direction of and held in contact with the adjusting screw 32, thereby holding the face of the bed stone and the runner stone apart and preventing them from being accidentally moved into contact with each other. The sieve is provided below the spout 12 with a detachable panel 41 which may be removed when it shall not be desired to sift the product, thus enabling the product to drop directly through the screen frame into a receptacle placed underneath, without making it necessary to first remove the sieve.

It will be seen from the foregoing description that I have provided a corn mill of exceedingly simple construction, whereby the corn may be ground to a desired degree of fineness, coarse, as well as fine, impurities being previously removed, and the product being sifted as it leaves the mill, all at a single operation. It will also be observed that the construction is such that the entire pressure of the stones while the mill is grinding is confined within the shelves or casing members constituting the housing of the stones; that is to say, the casing forms a complete housing within which the bed and runner stones are confined. The bed stone is held immovably within one end of the casing or housing, and the pressure whereby the runner stone is forced in the direction of the bed stone is taken up within the casing or housing, thus making an exceedingly durable and wear-resisting construction and one whereby ordinary accidents are avoided, thereby saving time and expense.

Having thus described the invention, what is claimed as new, is:—

A device of the class described, a shaft, a movable grinding disk mounted thereon, a screen, a cross bar pivotally connected at one end and having its free end disposed adjacent said screen, a shoe mounted upon said arm, a cam fixed upon said shaft and adapted to bear against said shoe, a contractile spring connected to the cross bar at a point adjacent the free end thereof, said spring being operated when said cam engages said cross bar to move the same forwardly, and a flat spring secured at one end to said spring, the opposite end of the latter mentioned spring being hingedly connected to the free end of said cross bar, said first mentioned spring effecting the longitudinal movement of said shaft.

In testimony whereof I affix my signature in presence of two witnesses.

ROBERT C. MEADOWS.

Witnesses:
 GRACE MEADOWS,
 VETRA MEADOWS.

Copies of this patent may be obtained for five cents each, by addressing the "Commissioner of Patents, Washington, D. C."